United States Patent
Matsumi et al.

(10) Patent No.: US 7,008,693 B2
(45) Date of Patent: Mar. 7, 2006

(54) HIGHLY HEAT-RESISTANT LABEL

(75) Inventors: Shino Matsumi, Tsukuba (JP); Takanari Yamaguchi, Tsukuba (JP); Hiroaki Kumada, Ami (JP); Masaru Kijima, Kawagoe (JP); Shinji Kinoshita, Sakai (JP); Koji Age, Osaka (JP)

(73) Assignees: Sumitomo Chemical Company, Osaka (JP); Yushi-Seihin Co., Ltd., Osaka (JP)

( * ) Notice: Subject to any disclaimer, the term of this patent is extended or adjusted under 35 U.S.C. 154(b) by 15 days.

(21) Appl. No.: 10/457,467

(22) Filed: Jun. 10, 2003

(65) Prior Publication Data

US 2004/0038025 A1 Feb. 26, 2004

(30) Foreign Application Priority Data

Jun. 11, 2002 (JP) ............................. 2002-169673

(51) Int. Cl.
*B32B 7/12* (2006.01)

(52) U.S. Cl. ...................... 428/349; 428/354; 428/447; 428/480; 428/355 EP

(58) Field of Classification Search ................ 428/349, 428/355 N, 480, 473.5, 354, 447, 355 EP
See application file for complete search history.

(56) References Cited

U.S. PATENT DOCUMENTS

| | | | |
|---|---|---|---|
| 3,265,765 A | | 8/1966 | Holden et al. |
| 3,637,595 A | | 1/1972 | Cottis et al. |
| 3,778,410 A | | 12/1973 | Kuhfuss et al. |
| 4,569,988 A | * | 2/1986 | Scola et al. .................. 528/353 |
| 5,227,456 A | * | 7/1993 | Shepherd et al. ............ 528/173 |
| 5,728,473 A | | 3/1998 | Inoue et al. |
| 5,741,883 A | | 4/1998 | Bryant |
| 6,228,452 B1 | * | 5/2001 | Oka et al. ................... 428/41.8 |
| 6,410,097 B1 | * | 6/2002 | Kume et al. ................. 427/387 |
| 2001/0051265 A1 | * | 12/2001 | Williams et al. ............ 428/343 |

FOREIGN PATENT DOCUMENTS

| | | |
|---|---|---|
| EP | 0649126 A1 | 4/1995 |
| EP | 1099739 A2 * | 5/2001 |
| GB | 1352088 | 5/1974 |
| JP | 40-23798 | 10/1940 |
| JP | 47-47870 | 2/1972 |
| JP | 48-11388 | 2/1973 |
| JP | 56-18016 B2 | 4/1981 |
| JP | 59-113010 A | 6/1984 |
| JP | 59-133203 A | 7/1984 |
| JP | 61-127709 A | 6/1986 |
| JP | 62-64809 A | 3/1987 |
| JP | 63-3888 B2 | 1/1988 |
| JP | 63-3891 B2 | 1/1988 |
| JP | 02-032184 * | 2/1990 |
| JP | 2-51523 A | 2/1990 |
| JP | 3-160008 A | 7/1991 |
| JP | 7-334088 A | 12/1995 |
| JP | 11-52861 A | 2/1999 |
| WO | WO 95/04764 A1 | 2/1995 |

OTHER PUBLICATIONS

English language abstract of JP 05047226 (Feb. 26, 1993).

* cited by examiner

*Primary Examiner*—Melanie Bissett
(74) *Attorney, Agent, or Firm*—Birch, Stewart, Kolasch & Birch, LLP

(57) ABSTRACT

Highly heat-resistant labels usable with the adherends which can be exposed to high temperatures are provided and include the following: (1) a highly heat-resistant label comprising a support base and a hot-melt adhesive layer composed of a thermoplastic resin showing optical anisotropy in molten state and/or a thermoplastic polyimide; (2) a label of (1), further having an agglutinant layer, wherein the agglutinant layer, hot-melt adhesive layer and support base are laminated in that order; and (3) a label of (1) or (2), wherein the thermoplastic resin showing optical anisotropy in molten state comprises a completely aromatic liquid crystal polyester.

7 Claims, No Drawings ent invention relates to a label and more particularly to a highly heat-resistant label which can be applied even to the adherends exposed to a high temperature exceeding 350° C.

HIGHLY HEAT-RESISTANT LABEL

BACKGROUND OF THE INVENTION

The present invention relates to a label and more particularly to a highly heat-resistant label which can be applied even to the adherends exposed to a high temperature exceeding 350° C.

BACKGROUND OF THE INVENTION

In many fields of industries such as foods, machinery, chemistry, etc., the labels printed with various indications such as marks, letters, patterns, etc., for example, the labels having such indications printed on one side of the support base and provided with an adhesive layer on the other side are attached to the products or their packages to facilitate the process management. A typical instance of such labeling technology is the management system making use of the bar code labels. In this bar code management system, information on various matters such as the state of production of the products, cost, etc., is mechanically read from the bar code labels to control the production, process of sale, etc.

The ordinary bar code labels, however, are stuck to the adherends through the medium of an adhesive layer composed of an acrylic resin or such, so that this adhesive layer might be decomposed or evaporated under the harsh temperature conditions of over 350° C., and therefore this labeling system was incapable of application in the fields of industries involving high-temperature treatments such as ceramic, iron and glass industries, for example, in the manufacturing process of cathode-ray tubes for television which includes the steps of sealing and annealing at 400 to 600° C., or in the process of working of metal products after hot rolling or hot molding.

In order to improve heat resistance of the adhesive layer, studies have been pursued for compounding a silicone resin and an inorganic material such as metal powder (JP-A-7-334088, JP-A-11-52861, etc.). These attempts, however, were unable to clear the problem that the adhesive force at high temperatures was not always satisfactory because of insufficient heat resistance of the silicone resin used as matrix.

SUMMARY OF THE INVENTION

In view of the above, an object of the present invention is to provide a highly heat-resistant label which can well be applied even to the adherends which may be exposed to high temperatures in use.

In the course of studies for solving the above problem, the present inventors found that a label having a hot-melt adhesive layer composed of a specific resin(s) such as a thermoplastic resin showing optical anisotropy in molten state and/or a thermoplastic polyimide demonstrates very high heat resistance. It was further found that a label having an additional agglutinant layer on the hot-melt adhesive layer side is capable of labeling no matter whether the adherend is low or high in temperature since this agglutinant layer can be stuck to the adherend at a low temperature while when exposed to a high temperature this agglutinant layer is decomposed or fluidized away and the hot-melt adhesive layer is melted and bonded to the adherend. The present invention has been attained on the basis of these findings.

Thus, the present invention envisions providing (1) a highly heat-resistant label having a support base and a hot-melt adhesive layer composed of a thermoplastic resin showing optical anisotropy in molten state and/or a thermoplastic polyimide, and (2) a highly heat-resistant label of the above (1) having an agglutinant layer on a hot-melt adhesive layer side.

In the present invention, the "label" in the highly heat-resistant adhesive label comprehends products which are similar to label but called by different appellations according to shape and other factors, such as tape, sheet, etc.

DETAILED DESCRIPTION OF THE INVENTION

A detailed explanation of the present invention follows.

The highly heat-resistant label according to the present invention comprises a support base and a hot-melt adhesive layer composed of a thermoplastic resin showing optical anisotropy in molten state and/or a thermoplastic polyimide. Here, the support base and the hot-melt adhesive layer can be laminated either directly or through the medium of an adhesive layer. In the former case, techniques such as hot pressure bonding can be used, and in the latter case, laminating methods such as melt lamination and dry lamination can be employed.

In the highly heat-resistant label of the present invention, an indication can be printed on a side of the support base opposite from a side onto which the hot-melt adhesive layer is laminated. Further, an agglutinant layer can be provided on a side of the hot-melt adhesive layer opposite from a side onto which the support base is laminated, namely on a hot-melt adhesive layer side of the label.

Here, in case no agglutinant layer is provided, the hot-melt adhesive layer is melted under a high temperature to adhere to the adherend, but in case an agglutinant layer is provided, this layer adheres to the adherend even at a low temperature, and when exposed to a high temperature, this agglutinant layer is decomposed or fluidized away and the hot-melt adhesive layer is melted and stuck to the adherend, thus allowing labeling at a low temperature, too.

The highly heat-resistant label according to the present invention can have the feature on the above-described laminate structure. The support base used in the present invention is not specifically defined as far as the material used therefor meets the requirement of high heat resistance. It is possible to use, for instance, foils of metals such as aluminum, lead, iron, copper, etc.; glass fiber paper, ceramic fiber paper, aramide fiber paper, thermosetting polyimide resins, epoxy resins, glass plate, glass sheet, ceramic plate, ceramic sheet, and the like. Metal foils such as aluminum foil are preferably used. Of course, information necessary for a label can be printed on a side opposite from the hot-melt adhesive layer lamination.

Thus, a preferred laminate structure of the label of the present invention is, for instance: printing layer/metal foil/(adhesive layer)/hot-melt adhesive layer, or printing layer/metal foil/(adhesive layer)/hot-melt adhesive layer/agglutinant layer.

For the hot-melt adhesive layer, a thermoplastic resin showing optical anisotropy in molten state and/or a thermoplastic polyimide can be used.

As the thermoplastic resins showing optical anisotropy in molten state, completely or half aromatic polyesters, polyesterimides, polyesteramides, etc., and a resin composition containing them can be cited for instance. The completely or half aromatic polyesters, viz. liquid crystal polyesters, and a resin composition containing such liquid crystal polyesters are preferred, and the completely aromatic liquid crystal polyesters and the resin composition containing them are more preferable.

The "liquid crystal polyesters" referred to herein are polyesters which are called thermotropic liquid crystal polymers. Typical examples of such liquid crystal polyesters are:

(1) Those comprising combinations of aromatic dicarboxylic acids, aromatic diols and aromatic hydrocarboxylic acids;

(2) Those comprising combinations of different types of aromatic hydroxycarboxylic acids;

(3) Those comprising combinations of aromatic dicarboxylic acids and aromatic diols; and (4) Those obtained by reacting aromatic hydroxycarboxylic acids with polyesters such as polyethylene terephthalate.

Typically, these liquid crystal polyesters form an anisotropic melt at a temperature below 400° C. In place of said aromatic dicarboxylic acids and aromatic diols and aromatic hydroxycarboxylic acids, their ester-forming derivatives can be used. Also, in place of these aromatic dicarboxylic acids and aromatic diols and aromatic hydroxycarboxylic acids, it is possible to use those in which nucleus has been substituted with a halogen atom, an alkyl group, an aryl group or the like.

(i) Recurring structural units deriving from aromatic dicarboxylic acids:

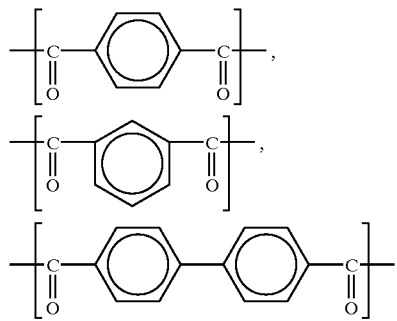

The hydrogen atom in the nucleus in each structure can be substituted with a halogen atom, an alkyl group or an aryl group.

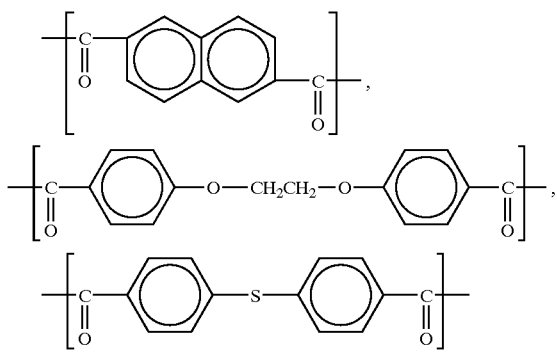

The hydrogen atom in the nucleus in each structure can be substituted with a halogen atom, an alkyl group or an aryl group.

(ii) Recurring structural units deriving from aromatic diols:

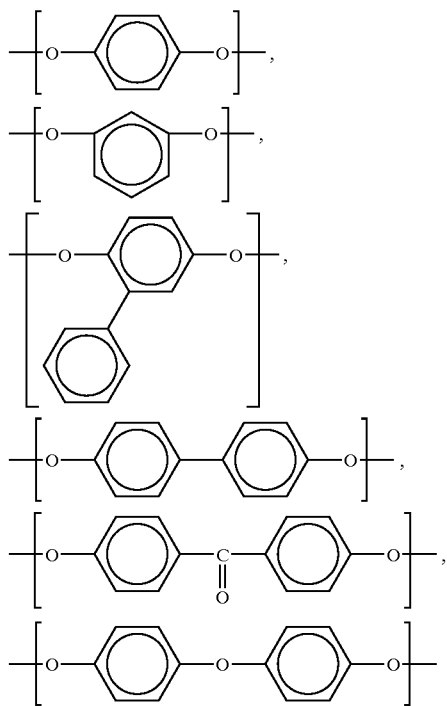

The halogen atom in the nucleus in each structure can be substituted with a halogen atom, an alkyl group or an aryl group.

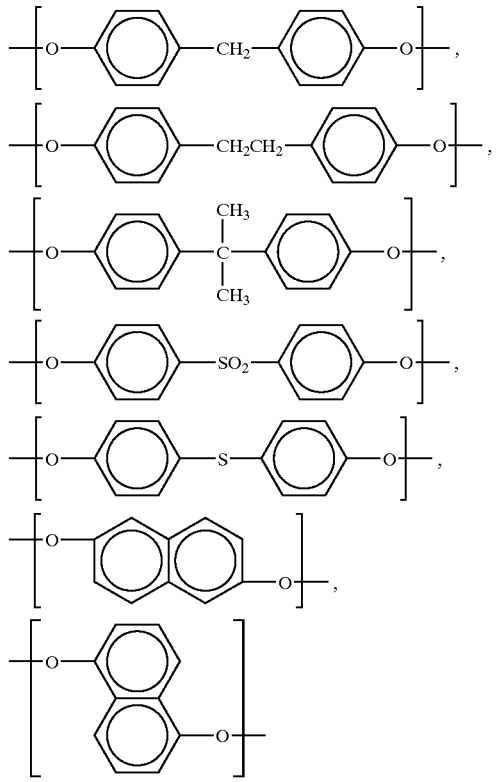

The hydrogen atom in the nucleus in each structure can be substituted with a halogen atom, an alkyl group or an aryl group.

(iii) Recurring structural units deriving from aromatic hydroxycarboxylic acids:

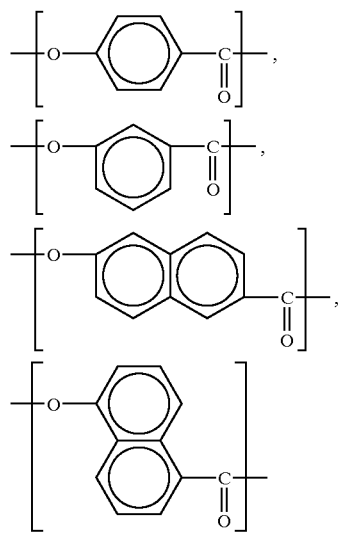

The hydrogen atom in the nucleus in each structure can be substituted with a halogen atom, an alkyl group or an aryl group.

The liquid crystal polyesters which are especially preferred in view of a balance of heat resistance, mechanical properties and workability are those having the recurring structural unit of

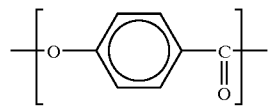

and those in which the percentage of this recurring structural unit is 30 mol % or more of the whole structural units are even more preferable.

Specifically, preferred combinations of the recurring structural units are those shown in (I) to (VI) below:

(I)

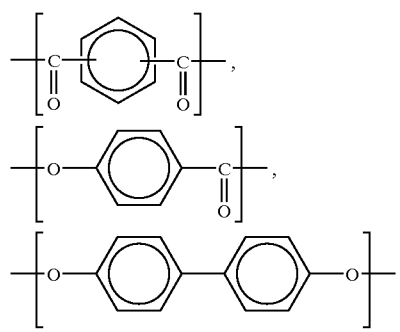

(II)

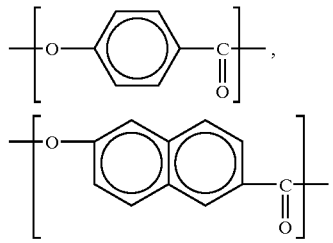

(III)

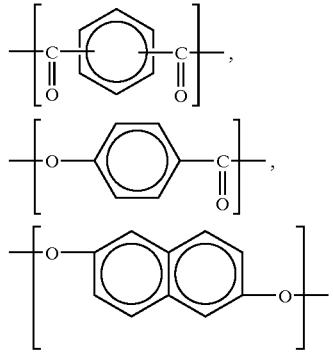

(IV)

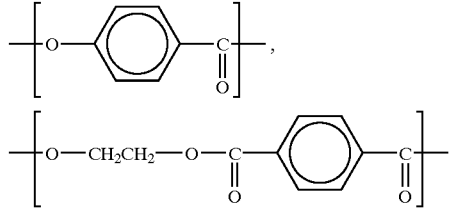

(V)

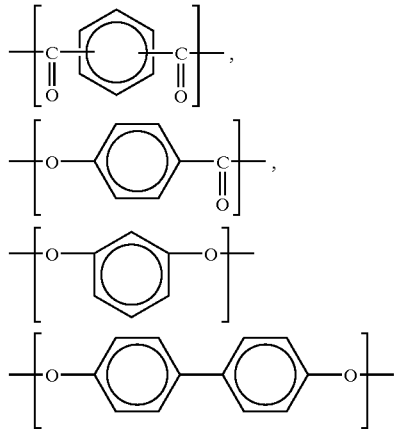

(VI)

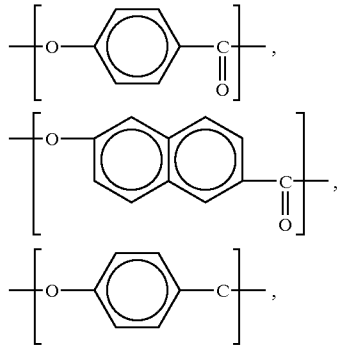

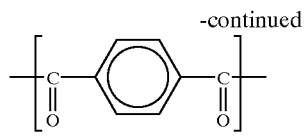

The processes for preparing the liquid crystal polyesters having the specified combinations of recurring structural units (I) to (VI) are disclosed in, for instance, JP-B-47-47870, JP-B-63-3888, JP-B-63-3891, JP-B-56-18016 and JP-A-2-51523. Among the above combinations of recurring structural units, the combination of (I), (II) or (IV) is preferred, and the combination (I) or (II) is more preferable.

For applications where especially high heat resistance is required, those of the liquid crystal polyesters which comprise 30 to 80 mol % of the following recurring unit (a'), 0 to 10 mol % of the following recurring unit (b'), 10 to 25 mol % of the following recurring unit (c') and 10 to 35 mol % of the following recurring unit (d') are preferably used.

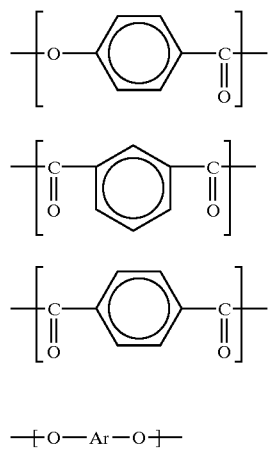

wherein Ar is a divalent aromatic group.

The above-mentioned diols are preferable for the recurring unit (d'), and completely aromatic diols are recommended for uses where particularly high heat resistance is required.

For applications where ease of exhaust of gas released from combustion after use is required from the standpoint of environmental concern, those of the liquid crystal polyesters of the present invention which have the structural units comprising a combination of carbon, hydrogen and oxygen alone are preferably used.

As thermoplastic resins showing optical anisotropy in molten state, which are used for the hot-melt adhesive layer, it is even more preferable in view of molding workability and performance of the produced film to employ a liquid crystal polyester resin composition, in which (A) a liquid crystal polyester constitutes a continuous phase and (B) a copolymer having a functional group reactive with the liquid crystal polyester forms a disperse phase.

The component (B) used for the said liquid crystal polyester resin composition is a copolymer having a functional group reactive with the liquid crystal polyesters. Any type of functional group having reactivity with the liquid crystal polyesters is usable for the purpose. Examples of such functional groups include oxazolyl groups, epoxy groups, amino groups, etc., of which epoxy groups are preferred.

Epoxy groups etc. can exist as a part of other functional groups. A typical example thereof is glycidyl group.

With reference to the copolymer (B), a method of introducing such a functional group having reactivity with the liquid crystal polyesters into a copolymer is not specifically defined, and known methods can be employed. For example, it is possible to introduce a monomer having the said functional group by means of copolymerization at the stage of the synthesis of the copolymer, or by graft copolymerizing a monomer having the said functional group to the copolymer.

As the monomer having a functional group reactive with liquid crystal polyesters, those having a glycidyl group are preferably used. Preferred examples of the monomers having a glycidyl group are unsaturated carboxylic glycidyl esters and unsaturated glycidyl ethers represented by the following formula:

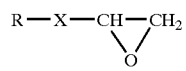

wherein R represents a $C_2$–$C_{13}$ hydrocarbon group having ethylenic unsaturated bond, and X represents —C(O)O—, —CH$_2$—O— or

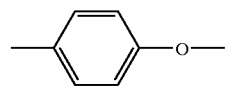

Examples of the unsaturated carboxylic acid glycidyl esters are glycidyl acrylate, glycidyl methacrylate, itaconic diglycidyl ester, butenetricarboxylic triglycidyl ester, and p-styrenecarboxylic glycidyl ester.

Examples of the unsaturated glycidyl ethers are vinylglycidyl ether, allylglycidyl ether, 2-methylallylglycidyl ether, methacrylglycidyl ether, and styrene-p-glycidyl ether.

Copolymer (B) preferably contains 0.1 to 30% by weight of unsaturated carboxylic glycidyl ester units and/or unsaturated glycidyl ether units.

The copolymers having functional groups such as mentioned above can be used as copolymer (B). An example of such copolymers is (meth)acrylic ester-ethylene-(unsaturated carboxylic glycidyl ester and/or unsaturated glycidyl ether) copolymer rubber. In this case, although the detailed mechanism is yet to be clarified, it is possible to improve heat resistance and workability of the whole copolymer by adding a (meth)acrylic ester.

The (meth)acrylic ester referred to herein is an ester obtained from an acrylic acid or methacrylic acid and an alcohol. This alcohol is preferably one having 1 to 8 carbon atoms in the molecule. Examples of such (meth)acrylic esters are methyl acrylate, methyl methacrylate, n-butyl acrylate, n-butyl methacrylate, tert-butyl acrylate, tert-butyl methacrylate, 2-ethylhexyl acrylate, and 2-ethylhexyl methacrylate. Either single or combined use of these (meth)acrylic esters is possible.

In the said copolymer rubber, the ratio of the (meth)acrylic ester units is preferably more than 40% by weight but less than 97% by weight, more preferably 45 to 70% by weight, the ratio of the ethylene units is preferably not less than 3% by weight but less than 50% by weight, more preferably 10 to 49% by weight, and the ratio of the unsaturated carboxylic glycidyl ether units and/or unsaturated glycidyl ether units is preferably 0.1 to 30% by weight, more preferably 0.5 to 20% by weight.

When the ratios of the respective structural units are outside the above-defined ranges, the composition may prove unsatisfactory in mechanical properties.

The said copolymer rubber can be produced by the conventional polymerization methods, for example, bulk polymerization, emulsion polymerization or solution polymerization using a free radical initiator. The representative polymerization method is one described in JP-A-48-11388, JP-A-61-127709, etc., in which polymerization is carried out under a pressure of 500 kg/cm$^2$ or above at 40 to 300° C. in the presence of a polymerization initiator which generates free radicals.

Other examples of copolymer (B) include acrylic rubber having a functional group reactive with liquid crystal polyesters, and vinyl aromatic hydrocarbon compound/conjugated diene compound block copolymer rubber having a functional group reactive with liquid crystal polyesters.

The acrylic rubber mentioned above is preferably one which is mainly composed of at least one monomer selected from the compounds represented by the following formulae (1) to (3):

$$CH_2=CH-C(O)-OR^1 \quad (1)$$

$$CH_2=CH-C(O)-OR^2OR^3 \quad (2)$$

$$CH_2=CR^4-C(O)-O(R^5C(O)O)_nR^6 \quad (3)$$

wherein R$^1$ represents a C$_1$–C$_{18}$ alkyl or cyanoalkyl group, R$^2$ represents a C$_1$–C$_{12}$ alkylene group, R$^3$ represents a C$_1$–C$_{12}$ alkyl group, R$^4$ represents a hydrogen atom or a methyl group, R$^5$ represents a C$_3$–C$_{30}$ alkylene group, R$^6$ represents a C$_1$–C$_{20}$ alkyl group or a derivative thereof, and n is an integer of 1 to 20.

Examples of the acrylic alkyl esters represented by the formula (1) are methyl acrylate, ethyl acrylate, propyl acrylate, butyl acrylate, pentyl acrylate, hexyl acrylate, octyl acrylate, 2-ethylhexyl acrylate, nonyl acrylate, decyl acrylate, dodecyl acrylate, and cyanoethyl acrylate.

The acrylic alkoxyalkyl esters represented by the formula (2) include, for example, methoxyethyl acrylate, ethoxyethyl acrylate, butoxyethyl acrylate, and ethoxypropyl acrylate. One or more of these compounds can be used as a main component of the said acrylic rubber.

As a constituent of such acrylic rubber, it is possible to use if necessary an unsaturated monomer which is copolymerizable with at least one type of monomer selected from the compounds represented by the above-shown formulae (1) to (3).

As examples of such unsaturated monomers, styrene, α-methylstyrene, acrylonitrile, halogenated styrene, methacrylonitrile, acrylamide, methacrylamide, vinylnaphthalene, N-methylolacrylamide, vinyl acetate, vinyl chloride, vinylidene chloride, benzyl acrylate, methacrylic acid, itaconic acid, fumaric acid, and maleic acid can be cited.

The preferred constitution of the said acrylic rubber comprises 40.0 to 99.9% by weight of at least one monomer selected from the compounds represented by the formulae (1) to (3), 0.1 to 30.0% by weight of an unsaturated carboxylic glycidyl ester and/or unsaturated glycidyl ether, and 0.0 to 30.0% by weight of an unsaturated monomer copolymerizable with at least one monomer selected from the compounds represented by the formulae (1) to (3).

When the ratios of the constituents of the said acrylic rubber fall within the above-defined ranges, the produced composition can advantageously have high heat and impact resistance as well as good molding workability.

The production method of the said acrylic rubber is not specifically defined; this rubber can be produced using the known polymerization methods such as described in JP-A-59-113010, JP-A-62-64809, JP-A-3-160008 and WO 95/04764, for example, emulsion polymerization, suspension polymerization, solution polymerization or bulk polymerization, in the presence of a radical polymerization initiator.

As the vinyl aromatic hydrocarbon compound-conjugated diene compound block copolymer rubber having a functional group reactive with the said liquid crystal polyesters, there can be cited, for instance, a rubber obtained by epoxylating a block copolymer consisting of (a) a sequence mainly composed of a vinyl aromatic hydrocarbon compound and (b) a sequence mainly composed of a conjugated diene compound, and a rubber obtained by epoxylating a hydrogenated product of the said block copolymer.

Examples of the vinyl aromatic hydrocarbon compounds suited for use for the above purpose include styrene, vinyltoluene, α-methylstyrene, p-methylstyrene, vinylnaphthalene, and the like, among which styrene is preferred.

Examples of the conjugated diene compounds are butadiene, isoprene, 1,3-pentadiene, 3-butyl-1,3-octadiene, and the like, with the butadiene and isoprene being preferred.

These vinyl aromatic hydrocarbon compound-conjugated diene compound block copolymers and the hydrogenation products thereof can be produced by the methods known in the art, such as described in JP-B-40-23798 and JP-A-59-133203.

Examples of the copolymers (B) include, beside the rubbers mentioned above, thermoplastic resins which are an epoxy group-containing ethylene copolymers consisting of (a) 50 to 99% by weight of ethylene units, (b) 0.1 to 30% by weight, preferably 0.5 to 20% by weight of unsaturated carboxylic glycidyl ester units and/or unsaturated glycidyl ether units, and (c) 0 to 50% by weight of ethylenic unsaturated ester compound units.

Exemplary of the ethylenic unsaturated ester compounds (c) are carboxylic vinyl esters such as vinyl acetate, vinyl propionate, methyl acrylate, ethyl acrylate, butyl acrylate, methyl methacrylate, ethyl methacrylate and butyl methacrylate, and α,β-unsaturated carboxylic alkyl esters of these compounds, vinyl acetate, methyl acrylate and ethyl acrylate are preferred.

Examples of the said epoxy group-containing ethylene copolymers include copolymers consisting of ethylene units and glydicyl methacrylate units, copolymers consisting of ethylene units and glycidyl methacrylate units and methyl acrylate units, copolymers consisting of ethylene units and glycidyl methacrylate units and ethyl acrylate units, and copolymers consisting of ethylene units and glycidyl methacrylate units and vinyl acetate units.

Melt mass flow rate (MFR, measured according to JIS K7210 at 190° C. under a load of 2.16 kg) of the epoxy group-containing ethylene copolymers is preferably 0.5 to 100 g/10 min, more preferably 2 to 50 g/10 min. The melt index may not necessarily be confined within the above-defined range, but it is to be noted that if the melt index of the ethylene copolymer exceeds 100 g/10 min, the produced composition tends to prove unsatisfactory in mechanical properties, and if it is less than 0.5 g/10 min, compatibility of the component (A) with the liquid crystal polyesters tends to deteriorate.

The said epoxy group-containing ethylene copolymers preferably have the modulus of flexural rigidity falling in the range of 10 to 1,300 kg/cm$^2$, more preferably 20 to 1,100 kg/cm$^2$.

If the modulus of flexural rigidity of the ethylene copolymer is outside the above-defined range, the composition may tend to turn out unsatisfactory in molding workability and/or mechanical properties.

The epoxy group-containing ethylene copolymers are preferably produced by a high-pressure radical polymerization method in which an unsaturated epoxy compound and ethylene are copolymerized in the presence of a radical forming agent with or without a suitable solvent or chain transfer agent under 500 to 4,000 atm. at 100 to 300° C. They can also be produced by a method in which an unsaturated epoxy compound and a radical forming agent are mixed with a polyethylene, and the mixture is melt graft copolymerized in an extruder.

As explained above, the copolymer (B) in the composition of the present invention can be either a thermoplastic resin or a rubber or can be a mixture thereof, but a rubber is preferred as it can provide a composition with better thermal stability and flexibility. Especially a (meth)acrylic ester-ethylene-(unsaturated carboxylic glycidyl ester and/or unsaturated glycidyl ether) copolymer rubber is preferably used. Also, in the copolymer (B) in the present invention, the number of the types of monomers composing the copolymer is not specifically restricted as far as all of such monomers can be polymerized in the desired way.

It is also desirable that the quantity of heat of fusion of crystal of the copolymer (B) is less than 3 J/g. Mooney viscosity of the copolymer (B), as measured according to JIS K6300 using a 100° C. large rotor, is preferably 3 to 70, more preferably 3 to 30, even more preferably 4 to 25.

If these parameters are outside the defined ranges, flexibility of the composition may tend to be unsatisfactory.

For applications where ease of exhaust of gases released from combustion or other treatments after use is required, it is preferable to use a copolymer comprising a combination of carbon, hydrogen and oxygen alone, among the above-mentioned preferable combinations of components.

The hot-melt adhesive layer in the present invention is preferably composed of a liquid crystal polyester resin composition in which a liquid crystal polyester (A) such as mentioned above constitutes a continuous phase while a copolymer (B) having a functional group reactive with said liquid crystal polyester forms a disperse phase.

When the liquid crystal polyester (B) does not form a continuous phase, the produced composition may tend to disadvantageously prove low in heat resistance.

In the resin composition comprising such a copolymer having a functional group and a liquid crystal polyester, although the detailed mechanism is yet to be clarified, it is considered that there takes place a reaction between the component (A) and the component (B) of said composition, with the component (A) forming a continuous phase while the component (B) being finely dispersed, and this leads to the improvement of mechanical properties of the obtained composition.

In a preferred embodiment of such a liquid crystal polyester resin composition, a liquid crystal polyester (A) accounts for 56.0 to 99.9% by weight, preferably 70.0 to 99.9% by weight, more preferably 85 to 98% by weight of the whole composition while a copolymer (B) having a functional group reactive with said liquid crystal polyester is contained in an amount of 44.0 to 0.1% by weight, preferably 30.0 to 0.1% by weight, more preferably 15 to 2% by weight.

When the component (A) is less than 56.0% by weight, the film molded from the composition may tend to disadvantageously turn out poor in heat resistance and chemical resistance; while when the component (A) exceeds 99.9% by weight, molding workability of the composition may tend to deteriorate, and also this is economically disadvantageous.

The known methods can be used for producing such a liquid crystal polyester resin composition. For instance, a method can be employed in which the components are mixed in a state of solution, and the solvent is evaporated or the mixture is precipitated in the solvent. From the industrial viewpoint, a method is preferred in which the respective components are kneaded in a molten state. Melt kneading can be effected by using conventional kneading means such as single- or double-screw extruder, various types of kneader, etc. A double-screw high-speed kneader is especially preferred.

In kneading, the respective components can be beforehand mixed homogeneously by suitable means such as tumbler or Henschel mixer. If necessary, the mixing can be omitted and a measured amount of each component can be supplied separately into the kneading device.

In the thermoplastic resin showing optical anisotropy in molten state according to the present invention, various kinds of additives such as heat stabilizer, flame-retardant, etc., can be added within limits not affecting the performance of the composition in the course of production process or during the ensuing working procedure.

Such a thermoplastic resin showing optical anisotropy in molten state is preferably used in the form of film. The film forming method is not specifically defined; it is possible to use, for instance, T-die method in which the molten resin is extruded from a T-die and taken up, blown-film extrusion method in which the molten resin is extruded into a cylindrical form from an extruder provided with a ring die, and the extrudate is cooled and taken up, hot press method, or other molding methods using a calender or rolls. T-die method and blown-film extrusion method are preferred.

The thermoplastic polyimide used for the hot-melt adhesive layer is free from any specific restrictions as far as it shows thermoplasticity. Preferably, such a polyimide can be obtained by reacting a diamine with an acid anhydride.

As such a diamine, there can be used, for instance, phenylenediamine, diaminodiphenylmethane, diaminodiphenylsulfone, diaminodiphenyl ether, 2,2-bis(4-(4-aminophenoxy)phenyl)propane, 1,3-bis(3-aminophenoxy)benzene, 4,4'-diaminodiphenylmethane, 3,3'-dimethylbenzidine, 4,4'-diamino-p-terphenyl, 4,4'-diamino-p-quaterphenyl, and 2,8-diaminodiphenylene oxide. As the acid anhydride, it is possible to use, for instance, trimellitic acid anhydride, pyromellitic acid dianhydride, biphenyitetracarboxylic acid dianhydride, and benzophenonetetracarboxylic acid dianhydride. These diamines and acid anhydrides can be used either singly or as a mixture of two or more.

The production method of the said thermoplastic polyimides is not specified in the present invention, and the known methods such as disclosed in JP-A-5-47854 can be employed. The thermoplastic polyimides are preferably used in the form of film. The film forming method is not subject to any specific restrictions; the film can be formed, for instance, by casting method in which a solution of polyimide acid, which is a precursor of polyimide, is cast, dried and heated, T-die method in which the molten resin is extruded from a T-die and taken up, blown-film extrusion method in which the molten resin is extruded into a cylindrical form from an extruder provided with a ring die, and the extrudate is cooled and taken up, hot press method, or a molding method using a calender or rolls. T-die method and blown-film extrusion method are preferred.

As described above, the highly heat-resistant label according to the present invention comprises a hot-melt adhesive layer. In this adhesive layer, in order to further improve heat resistance or for other purposes, an inorganic compound(s) and/or an organic compound(s) such as metal powder, organic fiber, etc., can be properly contained as additives, or the layer can be subjected to after-working such as heat treatment.

The thermoplastic resin composing the hot-melt adhesive layer of the present invention has a property that it is softened when heated and adheres to an adherend. Its flow temperature (FT) is e.g. 150 to 500° C., preferably 200 to 450° C., more preferably 250 to 400° C. With reference to the decomposition temperature as a measure of heat resistance, the 20% weight loss temperature in thermogravimetry conducted in a nitrogen atmosphere at a heating rate of 10° C./min is preferably not lower than 350° C., more preferably not lower than 450° C. Most preferably, the 60% weight loss temperature measured under the above conditions is not lower than 600° C.

The "flow temperature (FT)" referred to herein means the temperature (° C.) at which the melt viscosity measured by a capillary rheometer becomes 48,000 poises when a resin melted by heating at a heating rate of 4° C./min is extruded from a 1 mm$\phi$, 10 mm long nozzle under a load of 100 kgf/cm$^2$.

The highly heat-resistant label of the present invention comprises a support base and a hot-melt adhesive layer such as described above. The label can have an additional agglutinant layer on the hot-melt adhesive layer side.

Any of the known types of adhesives, such as acrylic, rubber and silicone type, can be used as the agglutinant of the agglutinant layer. For instance, the acrylic adhesives include emulsion type and solvent type, the rubber adhesives include emulsion type, solvent type and hot-melt type, and the silicone adhesives include solvent type as examples suited for use in the present invention. This agglutinant layer is preferably formed by applying an adhesive on the hot-melt adhesive layer so as to coat it. Coating can be made either entirely over or partly on the hot-melt adhesive layer. Any suitable coating method can be employed. For instance, in case of using a solvent type adhesive, a method is preferably used in which the adhesive is applied on the release paper side by using a knife coater or reverse coater, and after drying, the release paper is moisture-conditioned and then bonded to the hot-melt adhesive layer.

The acrylic adhesives can be copolymers comprising as their structural components a principal monomer for developing tackiness, a co-monomer for enhancing cohesive force, and a monomer having a functional group for improving adhesion and for conducting a reaction with the crosslinking agent. The copolymers may be crosslinked by using a crosslinking agent.

As the principal monomer, acrylic alkyl esters having $C_2$–$C_{14}$ alkyl groups, such as ethyl acrylate, n-butyl acrylate and n-octyl acrylate, and methacrylic alkyl esters having $C_4$–$C_{14}$ alkyl groups such as isobutyl methacrylate and n-octyl methacrylate can be cited as examples. Single or combined use of these monomers is possible.

As the co-monomer for enhancing cohesive force, the acrylic esters having $C_1$–$C_8$ alkyl groups, such as methyl acrylatel, methyl methacrylate, ethyl methacrylate and propyl methacrylate, styrene, vinyl acetate, acrylonitrile, methacrylonitrile, acrylamide, and the like can be used. A combination of two or more of these co-monomers may be used. It is also possible to add various types of additives arbitrarily to the adhesive.

Further, for improving adhesiveness and for facilitating the reaction with the crosslinking agent, monocarboxylic acids such as acrylic and methacrylic acid, polyvalent carboxylic acids such as maleic acid and glutamic acid and their anhydrides, and carboxylic acid derivatives having hydroxyl groups such as hydroxyethyl methacrylate and hydroxypropyl methacrylate can be used either singly or as a combination of two or more of them.

As the crosslinking agent, preferably epoxy resins, melamine resins, urea resins, polyisocyanates, phenol compounds, amino compounds, acid anhydrides, metal oxides and such are used. Suitable one can be selected in accordance with the type of the monomer having a functional group.

The silicone adhesives consist of two principal constituents: a polymer and a crosslinking agent. As the polymer, there are principally used high-molecular weight polydimethylenesiloxanes or polydimethylphenylsiloxanes having silanol groups (SiOH) at the end of the long chain of the polymer having principally the recurring unit of the formula —$SiO(CH_3)_2$—. The crosslinking resin used in the present invention has a three-dimensional silicate structure and is trimethylsiloxy-terminated.

It is considered that by properly reacting the terminal silanol group of the polymer with the trimethylsiloxane group at the end of the molecular structure of the crosslinking resin to effect partial crosslinkage, there is caused micro phase separation of the long chain portion, crosslinked portion and terminal portion to form a discontinuous phase, thereby producing tackiness.

In order to enhance adhesive force of the silicone adhesives, it is possible to elevate the density of siloxane crosslinkage, and organic peroxides, aminosilanes, organic acid metal salts and such can be used as catalyst.

The rubber adhesives usable in the present invention include natural rubber type, styrene/butadiene latex type, thermoplastic rubber type, and butyl rubber type.

The agglutinant layer need not always be decomposed if it is fluidized away when exposed to a high temperature and does not impair adhesion of the hot-melt adhesive layer, but it is preferable that its decomposition temperature (20% weight loss temperature in thermogravimetry) be lower than those of the thermoplastic resins and thermoplastic polyimides showing optical anisotropy when melted.

In case an agglutinant layer is provided, release paper or release film can be laminated on the outside of the layer for the purpose of protection of the self-adhesive.

The highly heat-resistant label according to the present invention can have a printing layer on the side of the support base opposite from a side onto which the hot-melt adhesive layer is laminated. The commonly used heat-resistant coating materials can be employed for the printing layer. As the resin moiety, there can be used silicone resins and silicone-modified versions of coating resins such as alkyd resins, urethane resins, epoxy resins, acrylic resins and melamine resins. As pigment, oxides of metals such as iron, nickel, chromium, titanium and aluminum, glass, clay, oxides of alkaline earth metals such as magnesium, calcium and barium, and composite oxides thereof can be used. A white heat-resistant coating material is preferably used to make the print clear.

EXAMPLES

The present invention is described in further detail with reference to the examples thereof, which examples however are merely intended to be illustrative and not to be construed as limiting the scope of the invention. The properties of the specimens were determined by the following methods.

[Property Determination Methods]

Flow Temperature (FT):
This is an index of melt fluidity. It was measured by a capillary rheometer (Koka-type flowtester CFT500 mfd. by Shimadzu Corp.) and expressed by the temperature (° C.) at which the melt viscosity became 48,000 poises when the sample resin (about 2 g) melted by heating at a heating rate of 4° C./min was extruded from a 1 mmϕ, 10 mm long nozzle under a load of 100 kg/cm².

Heat Resistance (Heat Decomposition Temperature):
The sample was heated by a thermogravimeter (differential calorimetric/thermogravimetric meter TG/DTA6200 mfd. by Seiko Instruments Co., Ltd.) in a nitrogen atmosphere at a heating rate of 10° C., and the change of weight was measured.

Optical Anisotropy:
Optical anisotropy of the sample resin in the molten state was determined by heating the sample resin powder with a size not greater than 250 μm on a heating stage at a heating rate of 25° C./min under polarized light, and observing the situation with the naked eye or by recording the quantity of transmitted light by an XY recorder.

Thermoresistant Adhesion Test:
The adhesive label sample cut to a length of about 400 mm was stuck to a heated 8 mm steel plate (adherend). It was allowed to cool by itself, and when the steel plate reached room temperature, it was hit by a hammer from the rear side or let drop from a height of about 1 meter. Evaluation was made according to whether the sample label was kept attached to the steel plate or not.

Referential Example 1

Liquid Crystal Polyester of Component (A)

8.3 kg (60 mol) of p-acetoxybenzoic acid, 2.49 kg (15 mol) of terephthalic acid, 0.83 kg (5 mol) of isophthalic acid and 5.45 kg (20.2 mol) of 4,4'-diacetoxydiphenyl were supplied to a polymerizer provided with a comb type agitator, then heated with stirring under a nitrogen gas atmosphere and polymerized at 320° C. for 2 hours. The by-product acetic acid gas was liquefied by a condenser and recovered while carrying out polymerization under vigorous stirring, and the produced polymer was taken out of the system in molten state. The obtained polymer was ground to less than 2.5 mm particles by a hammer mill (mfd. by Hosokawa Micron Co., Ltd.) and further treated at 280° C. for 5 hours under a nitrogen gas atmosphere in a rotary kiln to obtain a particulate completely aromatic polyester consisting of the following recurring structural units and having a flow temperature of 333° C.

Hereinafter, this liquid crystal polyester is called A-1. This polymer showed optical anisotropy at 340° C. or above under pressure. The recurring structural units of A-1 were:

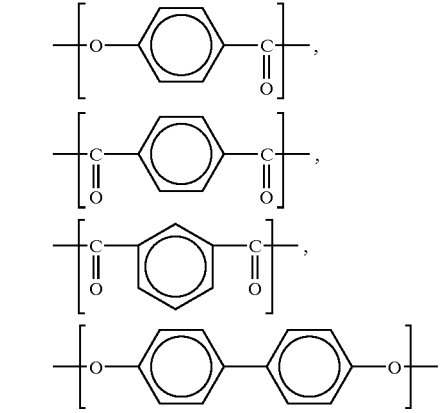

Referential Example 2

Component (B)

A rubber having the structure of methyl acrylate/ethylene/glycidyl methacrylate=60.0/37.0/3 (by weight ratio) with a Mooney viscosity of 15 was obtained according to the method described in Example 5 of JP-A-61-127709. This rubber is hereinafter called B-1.

The values of Mooney viscosity shown here are those measured at 100° C. according to JIS K6300 using a large rotor.

Referential Example 3

Liquid Crystal Polyester Film

90% by weight of A-1 and 10% by weight of B-1 were melt kneaded by a double-screw extruder TEX-30 (mfd. by Japan Steel Works, Ltd.) at a cylinder temperature of 350° C. and a screw rotating speed of 200 rpm to obtain the pellets of the composition. These pellets showed optical anisotropy at 340° C. or above under pressure, and their flow temperature was 328° C.

The pellets of the above composition were provided into a 60 mmϕ single-screw extruder provided with a cylindrical die to melt knead the pellets at a cylinder temperature of 350° C. and a rotating speed of 60 rpm, and the molten mixture was extruded upwards from the cylindrical die having a diameter of 70 mm, a lip interval of 1.0 mm and a setting temperature of 355° C. In this operation, dry air was forced into the hollow portion of the formed cylindrical film to expand it, and after cooling, it was passed through nip rolls and taken up to obtain a liquid crystal polyester resin composition film having an average measured thickness of about 25 μm. The stretch ratio (take-up rate/discharge rate) in the take-up direction was 17.7, and the blow ratio (expanded cylindrical film diameter/die lip outer diameter) was 2.3.

Also, the flow temperature (FT) of the film was 322° C., and its decomposition temperature (20% weight loss temperature) was 454° C.

Referential Example 4

97 parts by weight of n-butyl acrylate, 3 parts by weight of acrylic acid and 0.3 part by weight of lauroyl peroxide (used as polymerization initiator) were dissolved in ethyl acetate and the mixture was reacted at the reflux temperature of ethyl acetate in a nitrogen atmosphere for 14 hours to obtain an acrylic copolymer. To a 40% ethyl acetate solution of the obtained acrylic copolymer, 0.1 part by weight of an epoxy crosslinking agent was added to prepare an agglutinant solution. This is hereinafter called T-1.

Example 1

Using a 500 μm aluminum plate as support base and the film of Referential Example 3 as the hot-melt adhesive layer, they were bonded to each other with a solid paste to prepare a label sample. The alphabet and numbers were printed with carbon ink on the side of the label opposite from the hot-melt adhesive layer side to obtain an indicator label. This label is called L-1. It was subjected to a thermoresistant adhesion test. The test results are shown in Table 1. ○ indicates that the label was kept attached to the adherend, and x indicates that the label separated.

TABLE 1

| Steel plate temperature/° C. | Hit with hammer | Dropped from a height of 1 meter |
|---|---|---|
| 400 | ○ | ○ |
| 500 | ○ | ○ |
| 550 | ○ | ○ |
| 600 | ○ | ○ |

Example 2

The hot-melt adhesive layer side of L-1 obtained in Example 1 was coated with T-1 obtained in Referential Example 4 and dried in a 60° C. explosion-proof circulating oven for 2 hours to form a 25 μm thick agglutinant layer. The alphabet and numbers were printed with carbon ink on the side not coated with T-1 to obtain a label L-2.

L-2 could remain stuck to the steel plate with the tack of the agglutinant layer of T-1 from room temperature to 350° C. At the temperatures above that, there were obtained the similar results to Example 1.

Comparative Example 1

T-1 obtained in Referential Example 4 was applied on a 500 μm support base aluminum plate and dried in a 60° C. explosion-proof circulating oven for 2 hours to form a 25 μm thick agglutinant layer. The alphabet and numbers were printed with carbon ink on the side not coated with T-1 to obtain an indicator label L-3. This label was subjected to the thermoresistant adhesion test to obtain the results shown in Table 2. ○ indicates that the label remained attached to the adherend, and X indicates that the label separated. When the adherend temperature exceeded 450° C., there took place so much decomposition of the self-adhesive that it was even impossible to attach the label to the adherend.

TABLE 2

| Steel plate temperature/° C. | Hit with hammer | Dropped from a height of 1 meter |
|---|---|---|
| 400 | ○ | X |
| 450 | X | X |
| 500 | X | X |
| 600 | X | X |

EFFECTS OF THE INVENTION

The heat-resistant label according to the present invention excels in flexibility and has high heat resistance even in the high temperature region of 400–600° C. Further, the heat-resistant label of the present invention having an agglutinant layer can be directly bonded to the adherends, does not peel off and retains high heat resistance in the wide temperature range from room temperature to 600° C.

What is claimed is:

1. A highly heat-resistant label comprising a support base and a hot-melt adhesive layer composed of a thermoplastic resin showing optical anisotropy in molten state, an agglutinant layer and a heat-resistant coating layer mainly composed of a silicone resin;
   wherein the heat-resistant coating layer is provided on a side of the support base opposite from a side onto which the hot-melt adhesive layer is laminated,
   said agglutinant layer, hot-melt adhesive layer and support base are laminated in that order, and
   the thermoplastic resin showing optical anisotropy in molten state is a liquid crystal polyester resin composition, in which (A) a liquid crystal polyester constitutes a continuous phase and (B) a copolymer having a functional group reactive with said liquid crystal polyester forms a disperse phase.

2. A label according to claim 1, wherein heat resistance of the hot-melt adhesive layer is higher than that of the agglutinant layer.

3. A label according to claim 1 or 2, wherein the thermoplastic resin showing optical anisotropy in molten state comprises a completely aromatic liquid crystal polyester.

4. A label according to claim 1, wherein the functional group reactive with said liquid crystal polyester is an epoxy group, an oxazoline group or an amino group.

5. A label according to claim 1, wherein the support base is made of a metal, glass or a thermosetting resin.

6. A label according to claim 1, wherein an indication is printed on the heat-resistant coating layer.

7. A label according to claim 1, wherein an agglutinant used for the agglutinant layer is mainly composed of an acrylic adhesive.

* * * * *